(12) United States Patent
Stojanovski (10) Patent No.: US 11,026,430 B2
(45) Date of Patent: Jun. 8, 2021

(54) COOKING UTENSIL WITH CHANNEL GROOVES

(71) Applicant: Dimitrije Stojanovski, Shelby Township, MI (US)

(72) Inventor: Dimitrije Stojanovski, Shelby Township, MI (US)

(73) Assignee: Dimitrije Stojanovski, Shelby Township, MI (US)

( * ) Notice: Subject to any disclaimer, the term of this patent is extended or adjusted under 35 U.S.C. 154(b) by 130 days.

(21) Appl. No.: 16/295,413

(22) Filed: Mar. 7, 2019

(65) Prior Publication Data

US 2019/0200621 A1 Jul. 4, 2019

Related U.S. Application Data

(63) Continuation-in-part of application No. 15/192,105, filed on Jun. 24, 2016, now Pat. No. 10,251,513.

(51) Int. Cl.
| | |
|---|---|
| *A47J 37/06* | (2006.01) |
| *A21B 5/02* | (2006.01) |
| *A47J 43/20* | (2006.01) |
| *A47J 36/38* | (2006.01) |
| *A47J 37/01* | (2006.01) |
| *A47J 9/00* | (2006.01) |

(52) U.S. Cl.
CPC ............... *A21B 5/023* (2013.01); *A47J 36/38* (2013.01); *A47J 37/01* (2013.01); *A47J 37/067* (2013.01); *A47J 37/0611* (2013.01); *A47J 37/0694* (2013.01); *A47J 43/20* (2013.01); *A47J 9/007* (2013.01)

(58) Field of Classification Search
CPC .................. A47J 37/0611; A47J 37/067; A47J 37/0694; A47J 37/10; A47J 43/20; A47J 9/007; A47J 9/00
USPC ......... 99/422, 445, 372, 439, 441, 442, 428, 99/426, 430, 380, 384
See application file for complete search history.

(56) References Cited

U.S. PATENT DOCUMENTS

| | | | | |
|---|---|---|---|---|
| 472,811 | A * | 4/1892 | Pickett et al. .......... | A21B 3/155 99/445 |
| 1,020,004 | A * | 3/1912 | Wishman .............. | A47J 37/0611 99/384 |
| 1,678,690 | A * | 7/1928 | Connell ................... | A21B 5/02 99/384 |
| 2,044,615 | A * | 6/1936 | Kennedy .............. | A47J 37/0611 99/384 |
| 2,086,477 | A * | 7/1937 | Restel .................. | A47J 37/0611 99/384 |

(Continued)

*Primary Examiner* — Reginald Alexander
(74) *Attorney, Agent, or Firm* — Quinn IP Law (57) ABSTRACT

A cooking utensil includes a sheet metal tray of a substantially uniform thickness. The sheet metal tray includes a repeating pattern of depressed groove channels, each groove channel including in section raised channel sides and a depressed channel center. The repeating pattern includes a raised channel side of each of the depressed groove channels connecting with at least one raised channel side of a neighboring one of the depressed groove channels. The depressed channel center is configured to hold a bread product to be baked, and the raised channel sides are configured to keep the bread product in each of the depressed groove channels from contacting the bread product in neighboring depressed groove channels.

3 Claims, 11 Drawing Sheets

(56) References Cited

U.S. PATENT DOCUMENTS

| | | | |
|---|---|---|---|
| 8,692,164 B2 * | 4/2014 | Krishnan | A47J 37/0611 |
| | | | 219/450.1 |
| 2005/0204932 A1 * | 9/2005 | Tingley | A21B 3/155 |
| | | | 99/445 |

* cited by examiner

COOKING UTENSIL WITH CHANNEL GROOVES

CROSS-REFERENCE TO RELATED APPLICATIONS

This disclosure is a continuation-in-part application of U.S. patent application Ser. No. 15/192,105 filed on Jun. 24, 2016, which is hereby incorporated by reference.

TECHNICAL FIELD

This disclosure is related to a cooking utensil with channel grooves formed in the utensil. In particular, this disclosure is related to a pie plate, waffle iron, or similar cooking utensil with curved or spiral-shaped channel grooves formed in a cooking surface of the utensil.

BACKGROUND

The statements in this section merely provide background information related to the present disclosure. Accordingly, such statements are not intended to constitute an admission of prior art.

Cooking utensils such as pizza pans, cake pans, cookie sheets, waffle irons, etc. are configured to interface with a food product and transfer heat to the food product during the cooking process. Some food products assume the shape of a surface of the cooking utensil being used to cook the food. For example, pizza dough tends to assume a flat shape on the bottom to match the flat surface of the pizza pan. Waffle batter takes the shape of an inside of the waffle iron.

SUMMARY

A cooking utensil includes a sheet metal tray of a substantially uniform thickness. The sheet metal tray includes a repeating pattern of depressed groove channels, each groove channel including in section raised channel sides and a depressed channel center. The repeating pattern includes a raised channel side of each of the depressed groove channels connecting with at least one raised channel side of a neighboring one of the depressed groove channels. The depressed channel center is configured to hold a bread product to be baked, and the raised channel sides are configured to keep the bread product in each of the depressed groove channels from contacting the bread product in neighboring depressed groove channels.

BRIEF DESCRIPTION OF THE DRAWINGS

One or more embodiments will now be described, by way of example, with reference to the accompanying drawings, in which.

DETAILED DESCRIPTION

An improved cooking utensil is disclosed including arcuate groove channels upon a cooking surface of the utensil. The groove channels can include a number of exemplary shapes, for example including a spiral pattern or concentric circles. The shapes can extend to a center of the cooking utensil to include a single, unbroken cooking surface. Conversely, the shapes can include a center hole or open portion to the cooking surface where no cooking surface is present. Spiral designs can include a single groove channel spiraling about itself. Spiral designs can include two or more groove channels spiraling about each other. Groove channels can be shallow or deep, wide or narrow, depending in particular on the desired shape of the food product to be produced.

A single cooking utensil can be used, for example, as a pizza pan, with no top being used over the food product. Duel cooking utensils can be used, for example, containing the food product from a top and a bottom or from a left side and a right side, for example, as used in a waffle iron. Both cooking utensils can have groove channels, or one utensil can have groove channels and the other can be flat. Groove channels can be matched inverses of each other on opposite cooking utensils, for example, useful to create pastries with thick portions separated by narrow portions in a spiral shape (e.g. a cinnamon roll.) Groove channels can be matches of each other, with the curved surfaces keeping relatively a same distance between the cooking surfaces to create a wavy food product of approximately constant thickness, such as a wavy waffle ice cream cone. The surfaces of the channel grooves can be smooth or textured. The surface of the utensil can include through holes, for example, to permit steam to escape the food product as it is being cooked.

The cooking utensils can include any material known for use in cooking such as steel, aluminum, copper, ceramics, glass, or high-temperature polymers. The surfaces can be plain or treated with coatings known in the cooking art (e.g. non-stick coatings.) The utensils can include heating coils or induction mechanisms useful to provide heat to the food product.

Figure 1:
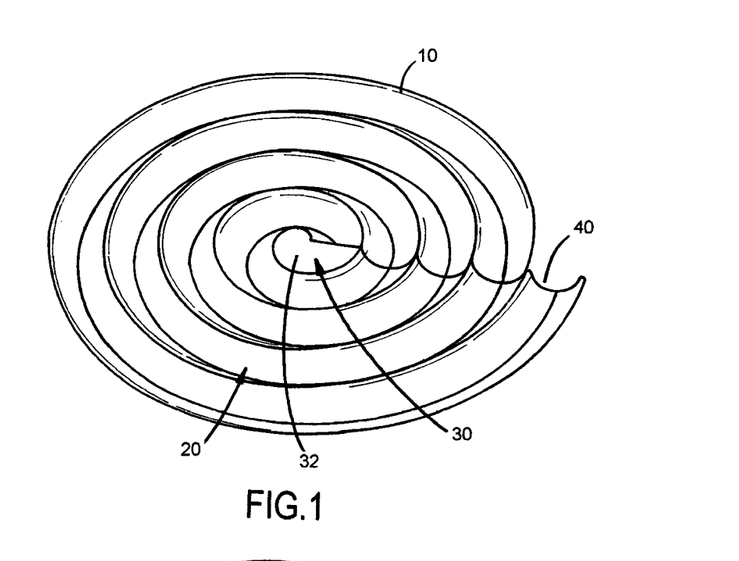
FIG. 1 illustrates in perspective view an exemplary cooking utensil including a spiral-shaped groove channel upon a cooking surface of the utensil, in accordance with the present disclosure.

Referring now to the drawings, wherein the showings are for the purpose of illustrating certain exemplary embodiments only and not for the purpose of limiting the same, FIG. 1 illustrates in perspective view an exemplary cooking utensil including a spiral-shaped groove channel upon a cooking surface of the utensil. Cooking utensil 10 is illustrated including a single groove channel 20 starting at a flat center portion 32 at center 30 of the utensil and terminating at U-shaped channel end 40. The U-shaped profile visible upon end 40 can extend through the entire length of groove channel 20.

Figure 2:
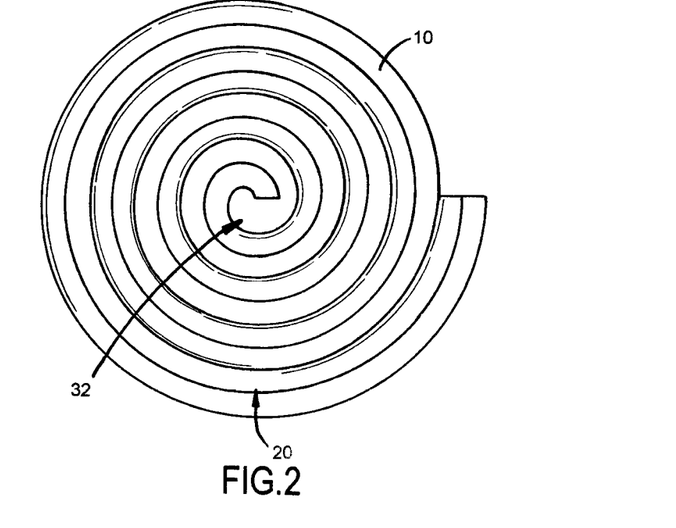
FIG. 2 illustrates the cooking utensil of FIG. 1 in a top view, in accordance with the present disclosure.

FIG. 2 illustrates the cooking utensil of FIG. 1 in a top view. Cooking utensil 10 is illustrated including a single groove channel 20 starting at a flat center portion 32 of the utensil and spiraling outward.

Figure 3:
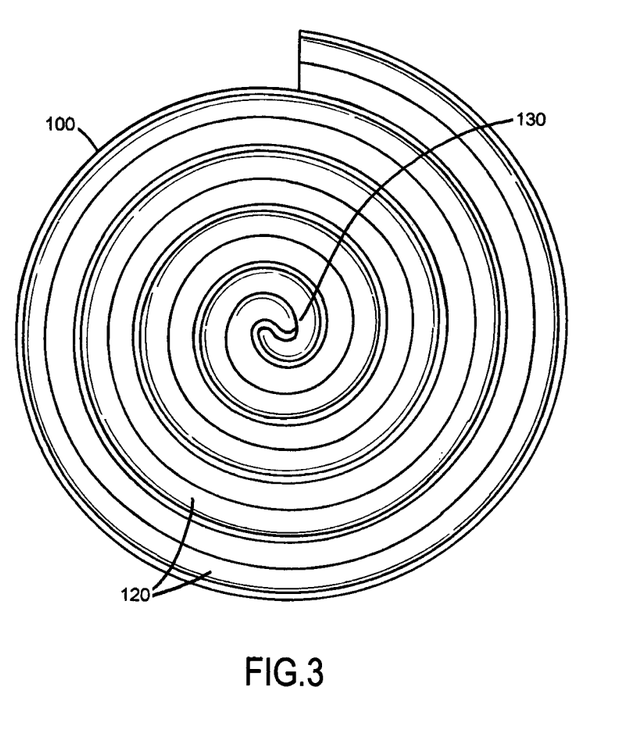
FIG. 3 illustrates an alternative exemplary cooking utensil including a spiral-shaped groove channel, wherein the spiral shaped channel extends to a center of the utensil, in accordance with the present disclosure.

FIG. 3 illustrates an alternative exemplary cooking utensil including a spiral-shaped groove channel, wherein the spiral shaped channel extends to a center of the utensil. Cooking utensil 100 is illustrated including a single groove channel 120 starting at a center 130 of the utensil. Groove channel 120 continues inward toward center 130 and is different from utensil 10 of FIG. 1 by having no flat center portion.

Figure 4:
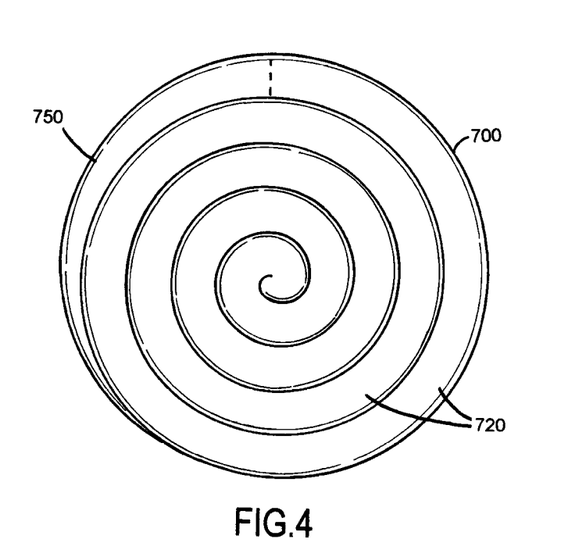
FIG. 4 illustrates an additional exemplary cooking utensil including a spiral-shaped groove channel, wherein an outer perimeter of the utensil includes a tapered portion configured to provide a nearly circular perimeter to the utensil, in accordance with the present disclosure.

FIG. 4 illustrates an additional exemplary cooking utensil including a spiral-shaped groove channel, wherein an outer perimeter of the utensil includes a tapered portion configured to provide a nearly circular perimeter to the utensil. Cooking utensil 700 is illustrated including a spiral shaped groove channel 720 spiraling outward from a center of the utensil. Instead of including a U-shaped channel end 40 as illustrated in the utensil of FIG. 1, utensil 700 includes a tapered portion 750, enabling an approximately circular outer perimeter of the utensil.

Figure 5A:
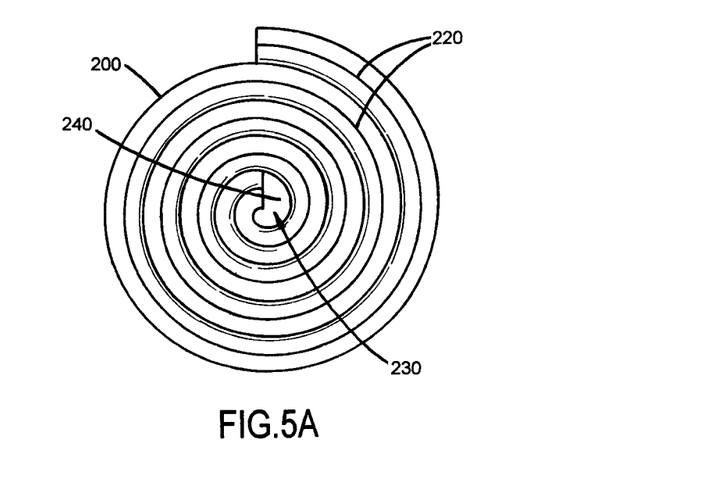
FIG. 5A illustrates an additional exemplary cooking utensil including a spiral-shaped groove channel, including a relatively small open center portion of the utensil, in accordance with the present disclosure.
Figure 5B:
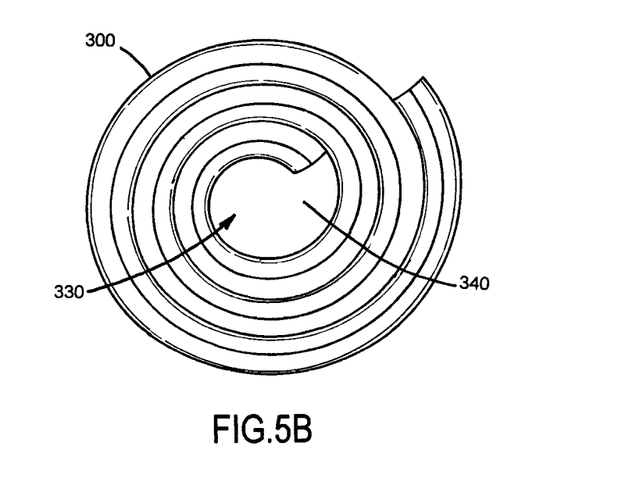
FIG. 5B illustrates an additional exemplary cooking utensil including a spiral-shaped groove channel, including a relatively large open center portion of the utensil, in accordance with the present disclosure.

FIG. 5A illustrates an additional exemplary cooking utensil including a spiral-shaped groove channel, including a relatively small open center portion of the utensil. Cooking utensil 200 is illustrated including a groove channel 220 spiraling around a center 230 of the utensil. The groove channel 220 terminates proximate to center 230 without completely filling a center portion of the utensil, leaving an open center portion 240 approximately one groove channel width wide open. FIG. 5B illustrates an additional exemplary cooking utensil including a spiral-shaped groove channel, including a relatively large open center portion of the utensil. Cooking utensil 300 is illustrated including a groove channel spiraling around a center 330 of the utensil. The groove channel terminates without completely filling a center portion of the utensil, leaving an open center portion 340 approximately three groove channel widths wide open. Utensils 200 and 300 are exemplary, and a center open portion of any width can be utilized in accordance with the disclosure.

Figure 6:
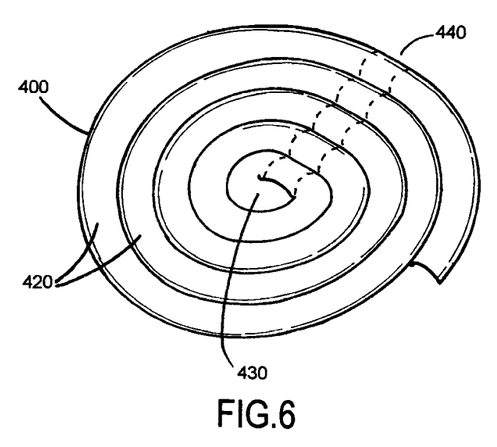
FIG. 6 illustrates an additional exemplary cooking utensil including a spiral-shaped groove channel, including a region of straight channel portions, in accordance with the present disclosure.
Figure 7:
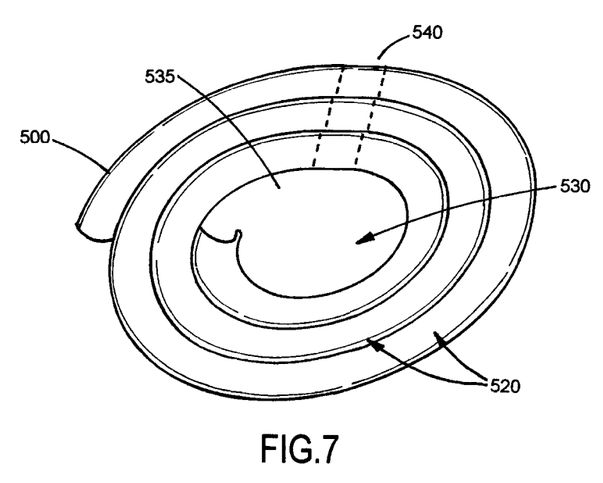
FIG. 7 illustrates an additional exemplary cooking utensil including a spiral-shaped groove channel, including a region of straight channel portions and an open center portion of the utensil, in accordance with the present disclosure.

FIG. 6 illustrates an additional exemplary cooking utensil including a spiral-shaped groove channel, including a region of straight channel portions. Cooking utensil 400 is illustrated including a single groove channel 420 starting at a center 430 of the utensil and spiraling outward. The spiral pattern of channel 420 is a modified spiral shape, including straight channel portions 440. These straight channel portions can make it easier for a spatula device to be used to lift a pastry or other food item off of the utensil. FIG. 7 illustrates an additional exemplary cooking utensil including a spiral-shaped groove channel, including a region of straight channel portions and an open center portion of the utensil. Cooking utensil 500 is illustrated including a single groove channel 520 including a modified spiral pattern including straight channel portions 540 and an open central portion 535.

Figure 8:
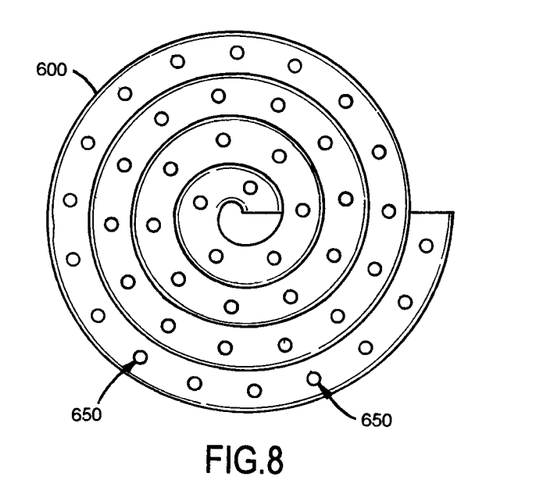
FIG. 8 illustrates an additional exemplary cooking utensil including a spiral-shaped groove channel, including a plurality of holes in the channel, in accordance with the present disclosure.

FIG. 8 illustrates an additional exemplary cooking utensil including a spiral-shaped groove channel, including a plurality of holes in the channel. Cooking utensil 600 is illustrated, including a spiral-shaped groove channel. The material of the groove channel includes a plurality of through holes 650, for example, enabling steam to escape from a food product. Any number and size of holes 650 can be used. The holes of FIG. 8 can be used on any of the exemplary configurations disclosed herein.

Figure 9:
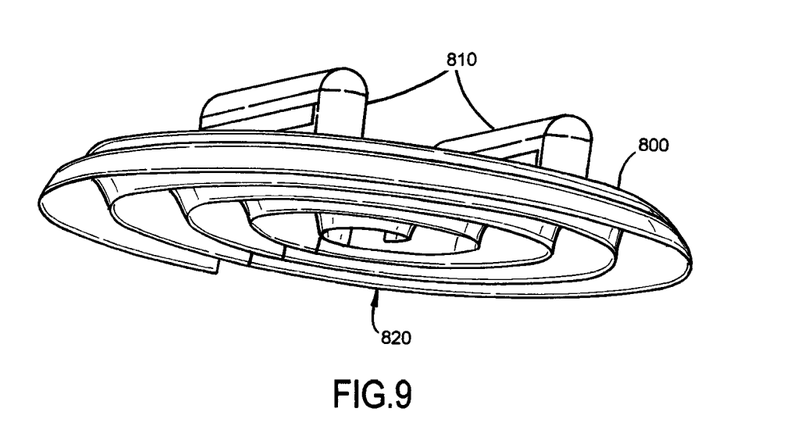
FIG. 9 illustrates an additional exemplary cooking utensil including a spiral-shaped groove channel, wherein the cooking utensil is a lid device, in accordance with the present disclosure.

FIG. 9 illustrates an additional exemplary cooking utensil including a spiral-shaped groove channel, wherein the cooking utensil is a lid device. Cooking utensil 800 is illustrated including handles 810 and a spiral pattern 820 including a groove channel formed on a bottom side of the lid. The lid can be placed over a pot, a pan, a cookie sheet, or pizza pan, and a food product such as a dough product can be cooked and allowed to expand into the shape of spiral pattern 820 of the lid set over the food product.

Figure 10:
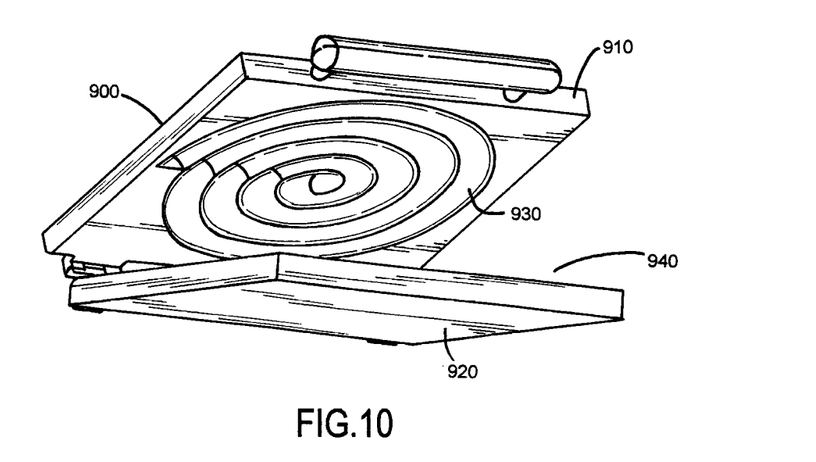
FIG. 10 illustrates an additional exemplary cooking utensil including a spiral-shaped groove channel, wherein the cooking utensil is a two sided self-heating cooking iron device, in accordance with the present disclosure.

FIG. 10 illustrates an additional exemplary cooking utensil including a spiral-shaped groove channel, wherein the cooking utensil is a two sided self-heating cooking iron device. Cooking utensil 900 is illustrated including an upper portion 910 and a lower portion 920, the two portions being joined at a hinge portion. Upper portion 910 is illustrated including a spiral pattern 930 formed with a groove channel according to the disclosure. Lower portion 920 includes cooking surface 940 which can be flat or include a groove channel pattern. Upper portion 910 and/or lower portion 920 can include heating elements to heat a food product placed between the portions.

Figure 11:
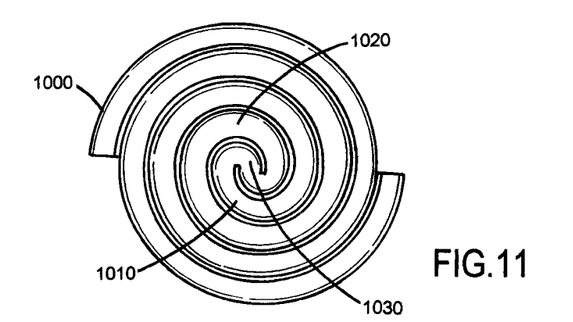
FIG. 11 illustrates an additional exemplary cooking utensil including a pair of spiral-shaped groove channels, in accordance with the present disclosure.

FIG. 11 illustrates an additional exemplary cooking utensil including a pair of spiral-shaped groove channels. Cooking utensil 1000 is illustrated including a first groove channel 1010 and a second groove channel 1020, the groove channels meeting at center 1030 of the utensil. Each of the groove patterns can terminate at the center 1030. In another example, as illustrated in FIG. 11, the two groove channels can meet and form a contiguous U-shaped channel between the two groove channels at center 1030.

Figure 12:
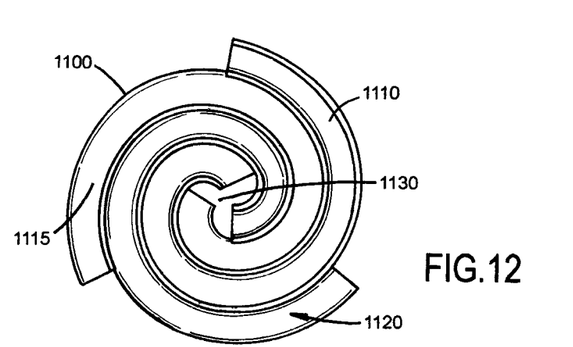
FIG. 12 illustrates an additional exemplary cooking utensil including a set of three spiral-shaped groove channels, in accordance with the present disclosure.
Figure 13:
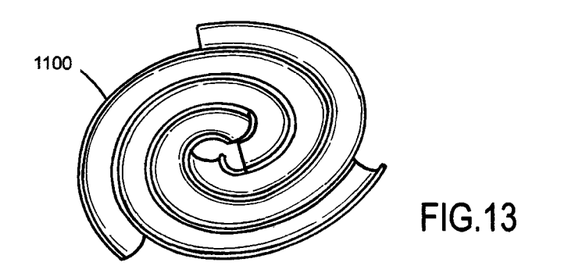
FIG. 13 illustrates the cooking utensil of FIG. 12 in perspective view, in accordance with the present disclosure.

FIG. 12 illustrates an additional exemplary cooking utensil including a set of three spiral-shaped groove channels. Cooking utensil 1100 is illustrated, including a first groove channel 1110, a second groove channel 1120, and a third groove channel 1130. The three groove channels are configured to leave an open center portion at center 1130. An outer portion 1115 of the groove channels can terminate with U-shaped channel ends. In another embodiment, each of the groove channels can include a tapered portion, providing a cooking utensil with an approximately round perimeter. FIG. 13 illustrates the cooking utensil 1100 of FIG. 12 in perspective view.

Figure 14:
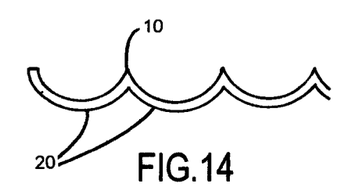
FIG. 14 illustrates the cooking utensil of FIG. 1 is cross-section view, with the U-shaped channels pointing in an upward direction, in accordance with the present disclosure.
Figure 15:
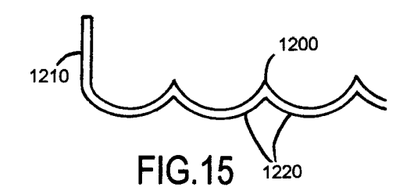
FIG. 15 illustrates an additional exemplary cooking utensil including a groove channel and a wall section provided upon an outer perimeter of the utensil, in accordance with the present disclosure.

FIG. 14 illustrates the cooking utensil of FIG. 1 is cross-section view, with the U-shaped channels pointing in an upward direction. Cooking utensil 10 is illustrated in profile, with a plurality of groove channels 20 illustrated embodied as U-shaped channels pointing upward. FIG. 15 illustrates an additional exemplary cooking utensil including a groove channel and a wall section provided upon an outer perimeter of the utensil. Cooking utensil 1200 is illustrated including a plurality of groove channels 1220 illustrated embodied as a plurality of U-shaped channels pointing upward. Wall portion 1210 is illustrated connected to a perimeter portion of utensil 1200, such that utensil 1200 includes cylindrical wall around a perimeter of the utensil. Any of the configurations disclosed herein can incorporate a wall around a perimeter of the device. Additionally, a wall can be used around an inner diameter of a utensil with an open central portion.

Figure 16:
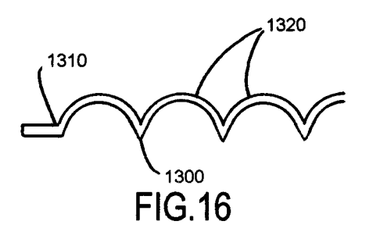
FIG. 16 illustrates an additional exemplary cooking utensil including a groove channel, wherein the U-shaped channels are pointing in a downward direction, and including a flat portion around a perimeter of the utensil, in accordance with the present disclosure.

FIG. 16 illustrates an additional exemplary cooking utensil including a groove channel, wherein the U-shaped channels are pointing in a downward direction, and including a flat portion around a perimeter of the utensil. Cooking utensil 1300 is illustrated including a plurality of groove channels 1320 illustrated embodied as a plurality of U-shaped channels pointing downward. Flat portion 1310 is illustrated forming a flat ring around an outer perimeter of utensil 1300. Such a flat portion can be used around a perimeter of any of the configurations disclosed herein. Similarly a flat portion can be used around an inner diameter of a utensil with an open central portion.

Figure 17:
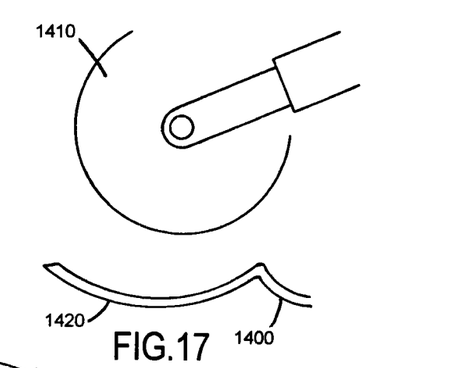
FIG. 17 illustrates an additional exemplary cooking utensil including a groove channel configured for use with an exemplary pizza cutting device, in accordance with the present disclosure.

FIG. 17 illustrates an additional exemplary cooking utensil including a groove channel configured for use with an exemplary pizza cutting device. Cooking utensil 1400 is illustrated, including a plurality of groove channels 1420 comprising shallow, curved profiles. The groove channels 1420 are illustrated to be shallower and wider than the groove channels 20 of FIG. 14. Groove channels 1420 are configured to permit a circular blade of pizza cutting device 1410 to roll through groove channels 1420, for example, to permit one to make a pizza crust with a curved, spiral pattern on the bottom of the crust while still permitting one to cut the pizza crust with device 1410.

Figure 18:
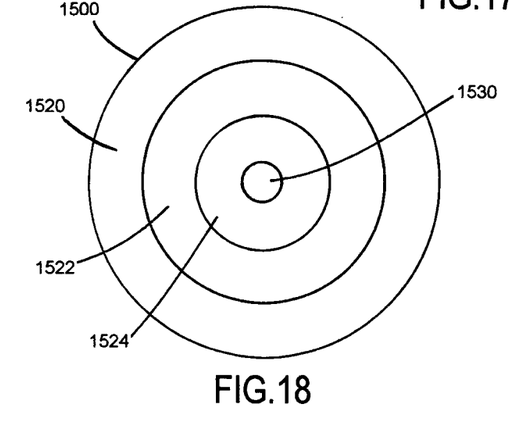
FIG. 18 illustrates an additional exemplary cooking utensil including a plurality of concentric ring groove channels, in accordance with the present disclosure.

FIG. 18 illustrates an additional exemplary cooking utensil including a plurality of concentric ring groove channels. In the alternative to the spiral-shaped configurations of the disclosure, cooking utensil 1500 illustrates one alternative shape to the spiral configuration. Groove channels 1520, 1522, and 1524 are illustrated as concentric ring shaped channels formed in the cooking surface of utensil 1500 around center 1530. Other shapes are similarly envisioned, for example, with several sizes of triangles or rectangles being formed, one within the next, with channels formed in each of the shapes.

FIGS. 14-16 show the cooking utensil in profile, illustrating the material of the utensil to have approximately consistent thickness, for example, as would be illustrated by a stamped piece of metal. Non-uniform thicknesses can be used, for example, with groove channels being cut from an exemplary disk-shaped pizza stone known in the art.

Figure 19:
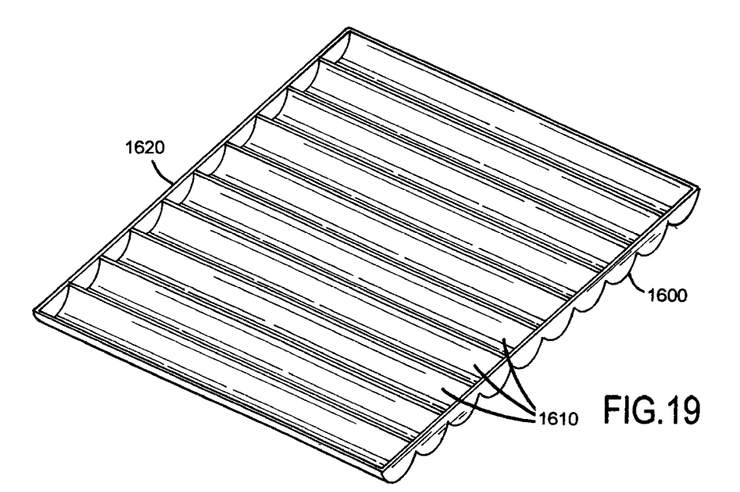
FIG. 19 illustrates an additional exemplary cooking utensil including a plurality rows of adjacent straight parallel groove channels, in accordance with the present disclosure.

FIG. 19 illustrates an additional exemplary cooking utensil including a plurality rows of adjacent straight parallel groove channels. Cooking utensil 1600 is illustrated including a plurality of adjacent straight parallel groove channels 1610. The groove channels, in some embodiments, can include wall portions 1620 sealing off the ends of the groove channels.

Figure 20:
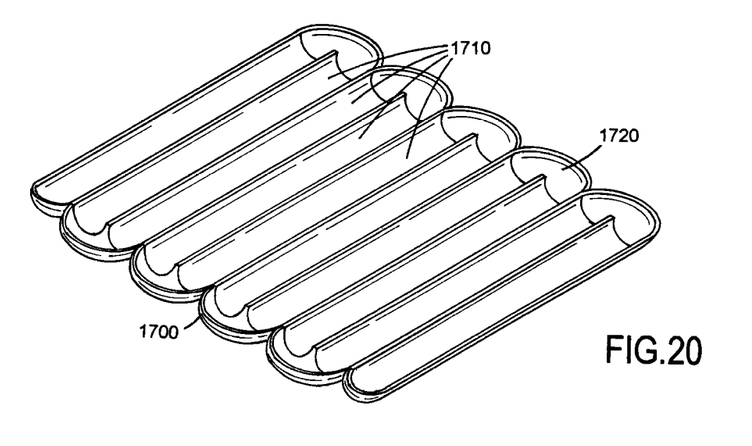
FIG. 20 illustrates an additional exemplary cooking utensil including a plurality rows of adjacent straight parallel groove channels with connecting curved end channels joining the parallel groove channels into a single long groove channel, in accordance with the present disclosure.

FIG. 20 illustrates an additional exemplary cooking utensil including a plurality rows of adjacent straight parallel groove channels with connecting curved end channels joining the parallel groove channels into a single long groove channel. Cooking utensil 1700 is illustrated including a plurality of adjacent straight parallel groove channels 1710. The groove channels 1710 include curved end channels 1720 connecting ends of the groove channels and causing the channels to form one long winding continuous groove channel.

Figure 21:
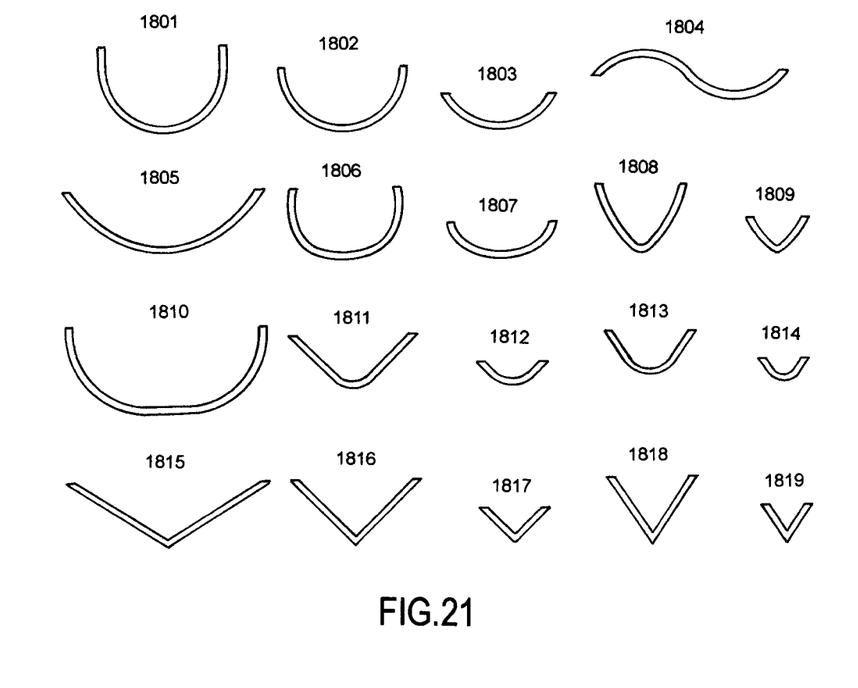
FIG. 21 illustrates a plurality of alternative groove channel profiles in cross-section, in accordance with the present disclosure.

FIG. 21 illustrates a plurality of alternative groove channel profiles in cross-section. Groove channel profiles 1801-1803 and 1805-1814 illustrate a plurality of different U-shaped channels that can be used upon the disclosed cooking utensils. Groove channel 1804 illustrates a sine wave shape including one U-shaped channel next to an inverted U-shaped channel. Groove channels 1815-1819 illustrate a plurality of different V-shaped channels that can be used upon the disclosed cooking utensils.

Figure 22:
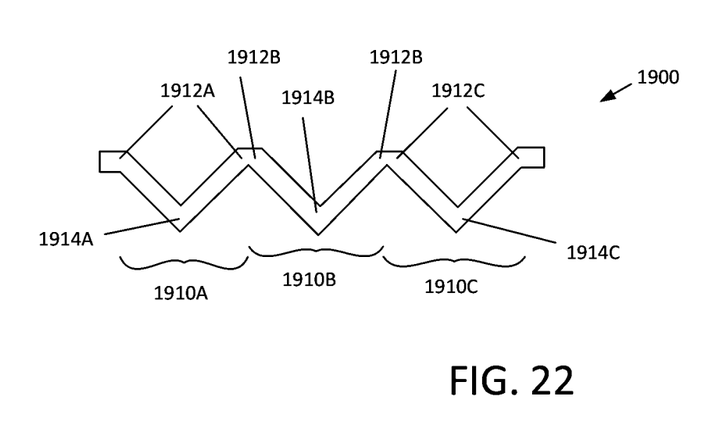
FIG. 22 illustrates an exemplary alternative embodiment of the disclosed cooking utensil in cross section, in accordance with the present disclosure.

FIG. 22 illustrates an exemplary alternative embodiment of the disclosed cooking utensil in cross section. Cooking utensil 1900 includes a sheet metal tray which can be constructed in an exemplary process of stamping a flat metal sheet. Cooking utensil 1900 can include a rolled edge around the sides of the utensil to make the utensil safe to handle without sharp edges. Cooking utensil 1900 can include a substantially uniform thickness. Cooking utensil 1900 is characterized by a repeating pattern of depressed groove channels 1910A, 1910B, and 1910C. Groove channel 1910A includes an exemplary V-shaped channel. It will be appreciated that the channel could alternatively be U-shaped or other similar shapes in section. Groove channel 1910A includes a depressed channel center 1914A and two raised channel sides 1912A. Groove channel 1910B includes a depressed channel center 1914B and two raised channel sides 1912B. Groove channel 1910C includes a depressed channel center 1914C and two raised channel sides 1912C. The illustrated repeating pattern is formed by a raised channel side of each of the depressed groove channels connecting with at least one raised channel side of a neighboring one of the depressed groove channels. In one embodiment, the depressed channel center is configured to hold a bread product to be baked and the raised channel sides are configured to keep the bread product in each of the depressed groove channels from contacting the bread product in neighboring depressed groove channels. FIG. 22 is exemplary, any number of repeating depressed groove channels can be utilized in a cooking utensil, the depressed groove channels can have varying shapes and dimensions, and the disclosure is not intended to be limited to the example provided.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device comprising a cooking utensil, the device comprising:
the cooking utensil comprising a sheet metal tray comprising:
a substantially uniform thickness;
a repeating pattern of depressed groove channels, each groove channel comprising in section raised channel sides and a depressed channel center, the repeating pattern comprising:
a raised channel side of each of the depressed groove channels connecting with at least one raised channel side of a neighboring one of the depressed groove channels; and
a plurality of parallel straight depressed groove channels; and
curved end channels connecting ends of the parallel straight depressed groove channels; and
wherein the depressed channel center is configured to hold a bread product to be baked; and
wherein the raised channel sides are configured to keep the bread product in each of the depressed groove channels from contacting the bread product in neighboring depressed groove channels.

2. The device of claim 1, wherein each of the depressed groove channels comprises a U-shaped cross section.

3. The device of claim 1, wherein each of the depressed groove channels comprises a V-shaped cross section.

* * * * *